April 30, 1935.    M. T. DE BOLT ET AL    1,999,286
BRAKE
Filed July 12, 1933    3 Sheets-Sheet 1

INVENTORS
M. T. De Bolt
J. E. Robertson
By
Hazard & Miller
ATTORNEYS

April 30, 1935.   M. T. DE BOLT ET AL   1,999,286
BRAKE
Filed July 12, 1933   3 Sheets-Sheet 2

INVENTORS
M. T. DeBolt
J. E. Robertson
By Hazard & Miller
ATTORNEYS

April 30, 1935.    M. T. DE BOLT ET AL    1,999,286
BRAKE
Filed July 12, 1933    3 Sheets-Sheet 3

INVENTORS
M. T. DeBolt
J. E. Robertson
By
Hazard & Miller
ATTORNEYS.

Patented Apr. 30, 1935

1,999,286

UNITED STATES PATENT OFFICE 1,999,286

BRAKE

Minor T. De Bolt, Bakersfield, and James E. Robertson, Los Angeles, Calif.

Application July 12, 1933, Serial No. 682,100

7 Claims. (Cl. 188—78)

This invention relates to improvements in brakes primarily designed to be used on vehicles but which may be used under other analogous circumstances.

An object of the present invention is to provide an improved brake construction wherein the brake shoes will have one hundred percent contact with the brake drum under all conditions of operation. In the operation of all brakes employing a brake drum continued operation produces a heating of the drum and a consequent expansion. In most brakes the brake shoes are mounted for movement about pivots which are eccentric with respect to the brake drum. Consequently such brake shoes when moved into engagement with the brake drum when the brake drum is cold may have a complete engagement therewith but, when the brake drum is expanded due to heat, the area of contact between the brake shoe and the brake drum is reduced. This results in an uneven wear on the brake shoe lining and a reduction in effective braking ability. Also the engagement of the shoe under these circumstances at one locality, leaving the remaining portion of the brake shoe out of engagement with the brake drum, enables this disengaged portion to vibrate resulting in brake noises which are objectionable. The present invention is designed to overcome all of these difficulties and disadvantages and to preserve a complete braking contact between each shoe entirely and the brake drum regardless of whether the drum is heated and expanded or whether the drum is cool and contracted. Such a construction enables a smoother operation of brake without danger of grabbing, prolongs the life of the brake linings, inasmuch as the wear is evenly distributed thereover, and eliminates the objectionable brake noises.

Another object of the invention is to provide an improved form of brake construction which is of simple and durable design enabling the construction to be easily installed and which is so designed as to enable brake shoes to be easily removed and replaced when the brake lining is ultimately worn out.

With the foregoing and other objects in view, which will be made manifest in the following detailed description, and specifically pointed out in the appended claims, reference is had to the accompanying drawings for an illustrative embodiment of the invention, wherein:

Figure 1:
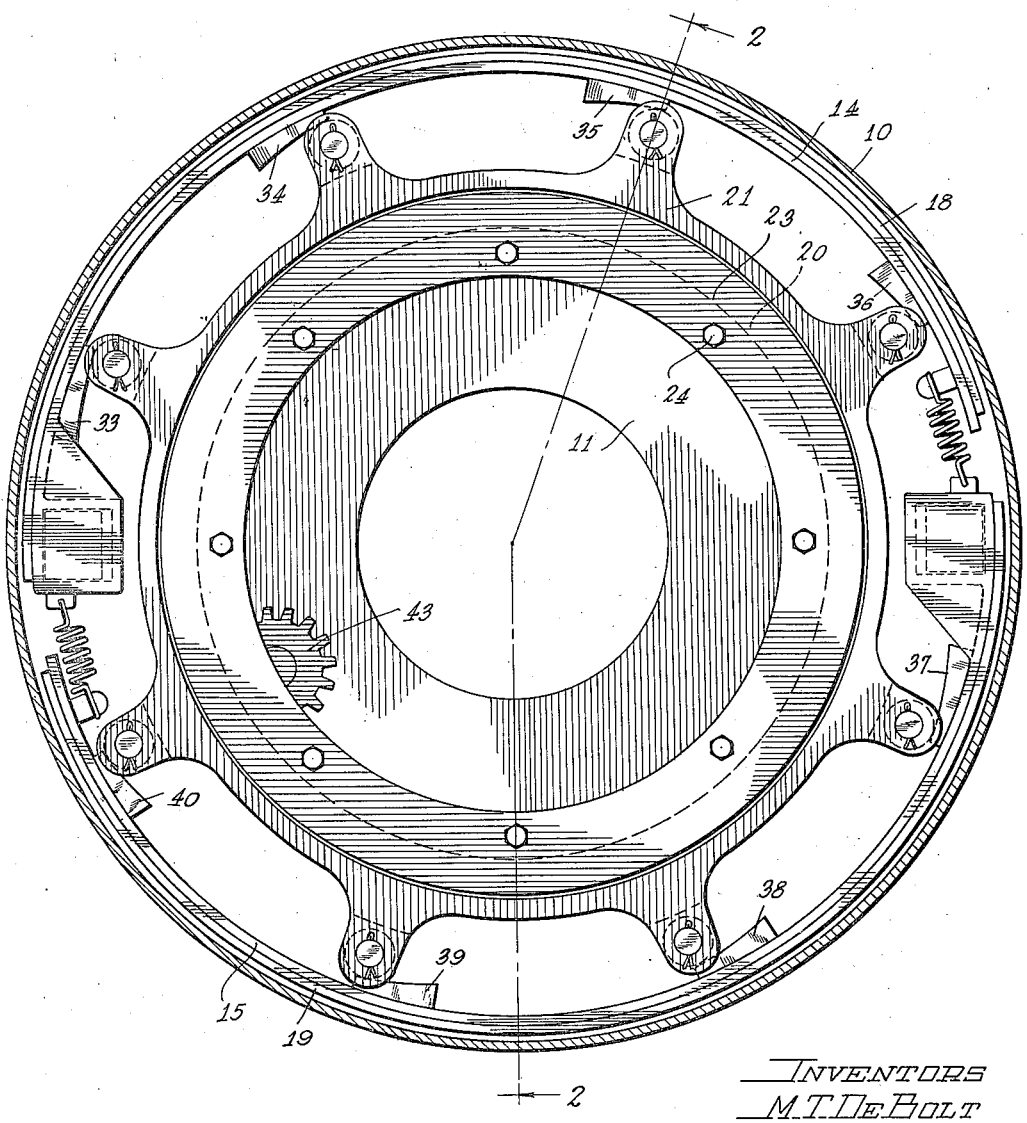
Fig. 1 is a sectional view through the brake drum illustrating the brake shoes and their operating mechanism in elevation therein.
Figure 2:
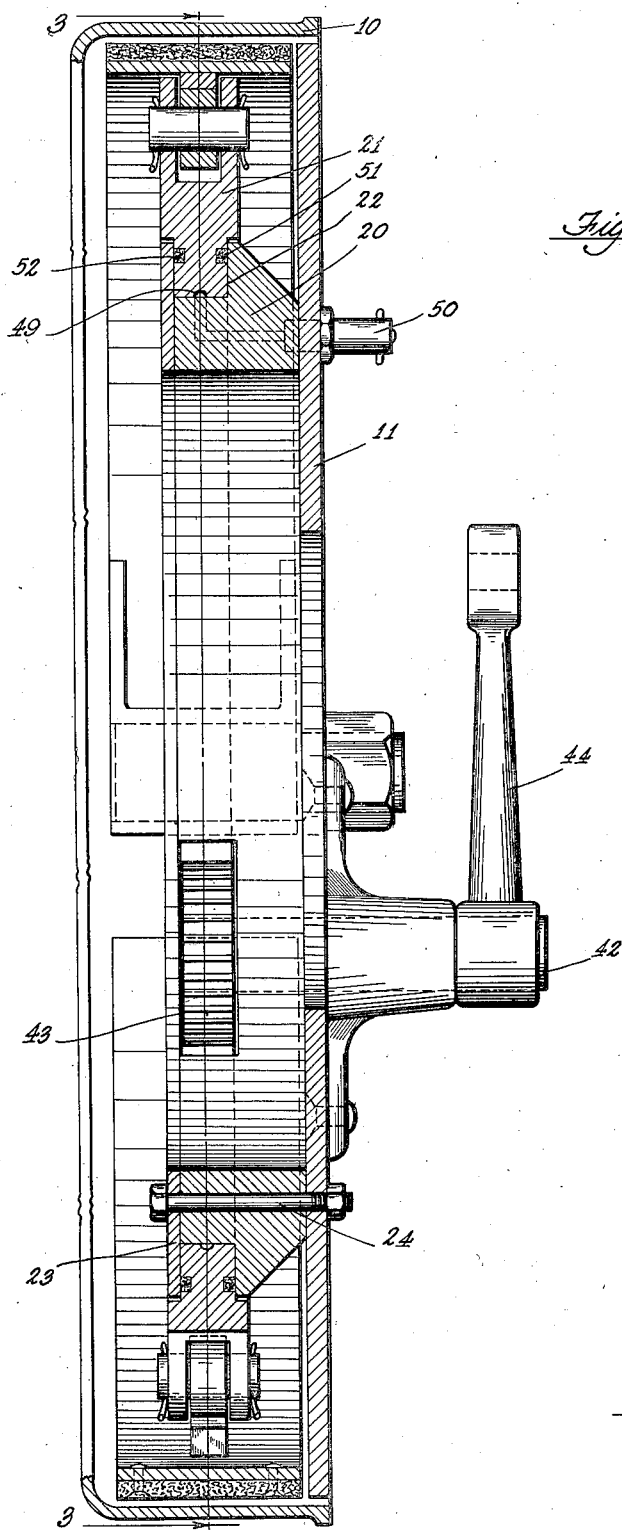
Fig. 2 is a sectional view taken substantially upon the line 2—2 upon Figure 1.

Referring to the accompanying drawings, wherein similar reference characters designate similar parts throughout, the reference character 10 designates the brake drum, which is conventionally mounted upon the wheel of the vehicle. Fitting within the brake drum there is disposed a dust shield 11 which is stationarily mounted on the rear axle housing of an automobile or truck. The type of brake shown is of the internal expanding type and the dust shield 11 carries a plurality of anchor studs or pins on which the brake shoes are mounted. The number of the brake shoes may vary, two brake shoes being shown upon the drawings. The anchor studs or pins for the respective brake shoes are indicated at 12 and 13. The brake shoes, indicated at 14 and 15, respectively, are formed of relatively stiff but bendable steel. At one end of each brake shoe there is formed a rectangular aperture 16 and 17, respectively, which receive the anchor studs or pins 12 and 13, respectively, on the stationary dust shield. These apertures 16 and 17 closely fit the anchor studs 12 and 13 in a circumferential direction but clearance is provided in a radial direction as is readily apparent from an inspection of Figure 3. The brake shoes are provided with suitable linings 18 and 19, as is conventional, which linings engage the interior surface of the brake drum 10. A ring 20 is fastened against the dust shield 11 providing a mounting construction for a rotary spider 21. This ring has a recess formed therein indicated at 22 in which a portion of the spider 21 fits. The spider is held on ring 20 by means of a retaining ring 23. This retaining ring is fastened against ring 20 and the ring 20 is fastened against the dust shield 11 by means of a series of bolts 24. The spider 21 carries a plurality of radially extending pairs of arms. The number of these pairs of arms on the spider may vary with brakes of different sizes, the number shown being eight. Of these there are four engageable with each shoe. Each pair of arms carries a roller which is rotatably mounted on a pin connecting the arms of each pair. Rollers 25, 26, 27 and 28, are engageable with brake shoe 14; while rollers 29, 30, 31 and 32, are engageable with brake shoe 15. On the interior surface of the brake shoes there are provided suitable wedge shaped cams, the cams on brake shoe 14 being indicated at 33, 34, 35 and 36. Likewise the cams on brake shoe 15 are indicated at 37, 38, 39 and 40. These cams can be riveted to the brake shoes, or otherwise secured thereto. They are engageable by their respective rollers.

In the drawings the brake is illustrated in fully contracted or drum disengaging position. It will be appreciated that if the spider 21 is rotated in a counter-clockwise direction that the rollers on the spider will engage their respective cams and force their respective brake shoes outwardly into engagement with drum 10. In order to effect a rotation of the spider 21, it is formed on its interior with a plurality of gear teeth 41. A spindle 42 carries a spur gear 43 meshing with the gear teeth 41 on the interior of the spider and also carries a crank 44 to which a brake rod 45 is connected. This brake rod and crank can be operated in any suitable manner, such as by the foot pedal on an automobile, or it may be operated by any hydraulic or air pressure system for operating brakes. A pull upon brake rod 45 will produce rotation of spur gear 43 and a consequent small rotary movement of the spider which rotates about the axis of rotation of the brake drum 10. This causes each roller to move on its respective cam to effect an outward movement of the brake shoes. As a means for contracting the brake shoes when the pull is taken off of brake rod 45, we find that small coil springs 46 and 47 which connect the anchored end of brake shoe 14 to the free end of brake shoe 15, and the anchored end of brake shoe 15 to the free end of brake shoe 14, respectively, will suffice. In fact with such an arrangement of springs 46 and 47, we find that it is unnecessary to employ an anchor spring between the anchor studs 12 and 13 and the inner sides of apertures 16 and 17, respectively.

Figure 3:
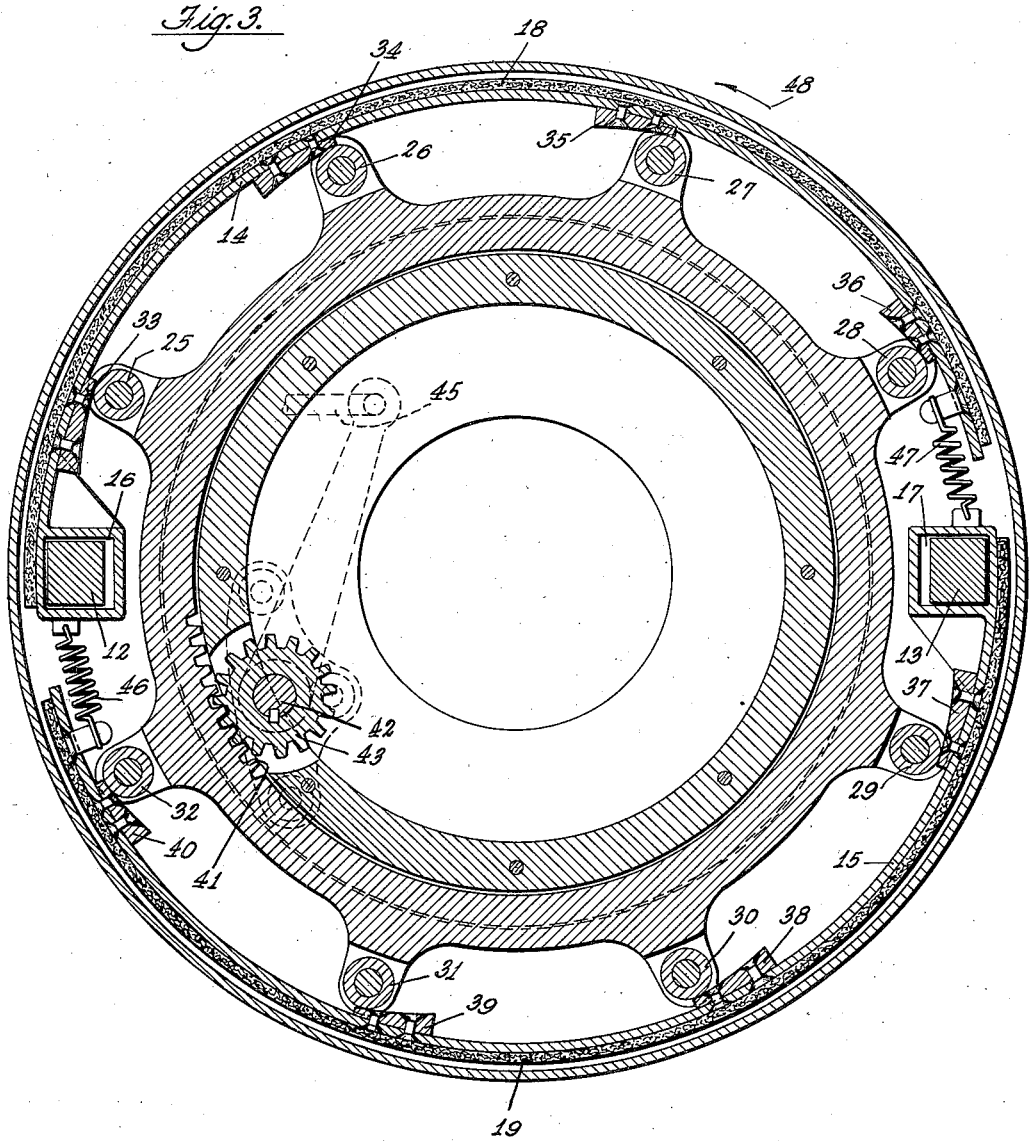
Fig. 3 is a vertical section taken upon the line 3—3 upon Figure 2.

Close inspection of Figure 3 will disclose that the wedge shaped cams 33, 34, 35 and 36, decrease in length progressively. In a like manner wedge shaped cams 37, 38, 39 and 40, decrease in length progressively. The large ends of each of the cams are of the same height from the interior surface of their respective brake shoes and also the small ends of all of the cams are of the same height or thickness. Consequently cams 33, 34, 35 and 36, have their cam surfaces, which are engaged by the rollers, of progressively increasing inclination. Likewise cams 37, 38, 39 and 40, are of progressively increasing inclination. The purpose of this arrangement of cams is to cause the brake shoes to conform to a true circle regardless of their radial position. If the brake drum 10 has become heated and consequently expanded, it will be necessary to move the brake shoes a greater radial distance to engage the drum than would be required in applying the brakes when the brake drum is cold. Considering specifically cam 33, which is closest to the anchored end of brake shoe 14, movement of roller 25 along this cam merely produces a radial movement of this end of the brake shoe inasmuch as aperture 16 closely fits anchor stud 12 in a circumferential direction. Consequently this cam is the flattest cam on brake shoe 14. Cam 34, which is more spaced from the anchored end of brake shoe 14, is at a location on the brake shoe which not only undergoes a radial movement but a slight circumferential movement toward the anchored end of brake shoe 14 when the brakes are applied. Consequently this cam during the application will move slightly in the direction of movement of roller 26. Accordingly this cam may be slightly shorter than cam 33 but it is required to have a slightly greater inclination because the cam 34 and roller 26 moving to a certain extent in the same direction will not have as great a relative movement between each other as takes place between roller 25 and cam 33. This greater inclination compensates for the decreased relative movement and causes the brake lining adjacent cam 34 to be forced into engagement with the brake drum 10 with an equal force to that imposed upon the brake lining adjacent cam 33. In a similar manner cam 35, which is spaced farther from the anchored end of brake shoe 14 than cam 34, may be slightly shorter than cam 34 but must have a slightly greater inclination inasmuch as this cam undergoes a greater circumferential movement in applying the brake than cam 34. Consequently due to this greater circumferential movement there is less relative movement between roller 27 and cam 35 which must be compensated for by the greater inclination of the cam surface in order that the brake lining adjacent this cam can be forced against the brake drum with a force equal to that of the line adjacent cam 33. Likewise cam 36 may be the shortest of the cams but must have the greatest inclination inasmuch as this cam undergoes the greatest circumferential movement in applying the brakes and there is the less relative movement between roller 28 and cam 36. Cams 37, 38, 39 and 40, are made of progressively increasing inclinations for the same reasons. The brake shoes while formed of relatively stiff steel are nevertheless bendable or capable of being flexed and with this arrangement of operating mechanism it will be appreciated that when the brake shoe is forced into engagement with the brake drum 10 while cold, it can be caused to conform exactly to a perfect circle the diameter of which is equal to the internal surface of the cold brake drum. If the brake drum becomes heated and consequently expands, the brake shoe will be bent or flexed causing it to assume a greater radius of curvature to conform exactly to the circle of the expanded brake drum. In this way one hundred percent braking area or contact is maintained at all times under all working conditions inasmuch as the brake lining on each shoe will engage the drum entirely when the brake drum is cold as well as when the brake drum is heated and expanded. The preservation of complete engagement between the brake lining and the brake drum causes the brake to be of easy and gentle operation so that there is no tendency for the brake shoes to grab. Also inasmuch as the brake shoe is forced into engagement with the drum with equal force at all points, the wear will be evenly distributed over the entire brake lining, thus prolonging the life of a given lining. As there are no disengaged portions of the shoes which are free to vibrate, objectionable brake noises cannot be produced with the improved brake. The stiffness of the brake shoes causes the outward pressure to be evenly distributed between adjacent cams so that the outward pressure is not localized at the cams only. Also the slight flexibility of the brake shoes permits of an automatic adjustment in a transverse direction. When the brake drums become heated, the free edge of the drum usually expands a very little bit more than the side of the brake drum which is attached to the vehicle wheel. The arrangement is such that the brake shoes may automatically adjust themselves to the brake drum under these conditions.

When it is desired to remove a shoe to replace linings thereon, this may be easily accomplished by removing the wheel of the vehicle and consequently removing the drum. Springs 46 and 47 can be detached with a screwdriver and the shoes bodily lifted off of the anchor studs 12 and 13 by merely slipping the shoes between the rollers and the drum. If a supply of relined shoes are kept in stock, relined shoes can be instantly substituted for the removed shoes and the vehicle wheel and brake drum reapplied taking only a few minutes to supply an automobile or truck with relined brakes. The direction of rotation of the brake drum with respect to the brake shoes is preferably in the direction of the arrow 48.

While the rotation of the spider 21 with respect to rings 20 and 23 is only slight, we prefer to provide a means of lubricating the spider. To this end the interior surface of the spider is provided with a grease groove 49 which is supplied with grease or lubricant through fitting 50. Dust felts 51 and 52 in the sides of the spider prevent the escape of the grease and maintain it between the engaging surface of the spider and the rings to effectively lubricate the spider.

From the above described construction it will be appreciated that an improved, novel, simple and advantageous brake construction is provided wherein a bendable brake shoe capable of being flexed slightly is employed. This brake shoe is caused to conform truly to a perfect circle regardless of whether it is engaging a cold brake drum or a heated or expanded brake drum. The outward pressure on the shoe is equal at all points, thus distributing the braking effectiveness and distributing the wear on the brake lining. While the invention has been illustrated as having been applied to an internal expanding brake, which is the preferred form, it will be understood that with but minor changes the same principles may be incorporated in an external contracting brake.

Various changes may be made in the details of construction without departing from the spirit or scope of the invention as defined by the appended claims.

We claim:

1. A brake comprising a brake drum, shoes anchored at their ends and engageable with the brake drum, each shoe carrying a plurality of cams arranged at intervals, and means engageable with the cams for forcing the shoe into engagement with the brake drum, said cams being of progressively different inclinations from the anchored end of each shoe to the free end of each shoe.

2. A brake comprising a brake drum, shoes anchored at their ends and engageable with the brake drum, each shoe carrying a plurality of cams arranged at intervals, and means engageable with the cams for forcing the shoe into engagement with the brake drum, said cams being of progressively different lengths from the anchored end of each shoe to the free end of each shoe.

3. A brake comprising a brake drum, anchored shoes engageable with the brake drum, rotary means rotatable about the axis of rotation of the drum, and means providing an engagement between the rotary means and the brake shoes at a plurality of spaced points whereby on movement of said rotary means the brake shoes will be forced into engagement with the drum, the last mentioned means making compensation for the differences between the curvature of the shoes when in disengaging position, or when in engaging position with the drum when cold or when in engaging position with the drum when the latter is warm and serving to deform the shoe to the arc required.

4. A brake comprising a brake drum, anchored brake shoes engageable therewith, rotary means rotatable about the axis of rotation of the drum, each shoe carrying a plurality of spaced cams engageable by said rotary means, the cams being of progressively increasing inclination from the anchors to the free ends of the shoes to compensate for change of curvature of the shoes required in different radial positions.

5. A brake comprising a brake drum, anchored brake shoes engageable therewith, a rotary spider rotatable about the axis of rotation of the brake shoe cams mounted at intervals upon each shoe engageable by the arms of the spider whereby upon rotation of the spider the shoes will be forced into engagement with the drum, said cams being of progressively decreasing inclination from the free ends of each shoe toward the anchors therefor.

6. A brake comprising a rotary brake drum, a dust shield, brake shoes anchored upon the dust shield, a spider rotatably mounted upon the dust shield for movement about the axis of rotation of the drum, rollers carried by the spider, and cams on the shoes engageable by the rollers on the spider, said cams being of progressively decreasing inclination from the free end of each shoe to its anchored point.

7. A brake comprising a rotary brake drum, a dust shield, brake shoes anchored upon the dust shield, a spider rotatably mounted upon the dust shield for movement about the axis of rotation of the drum, rollers carried by the spider, cams on the shoes engageable by the rollers on the spider, said cams being of progressively decreasing inclination from the free end of each shoe to its anchored point, and springs connecting the free end of each shoe to the anchored end of the adjacent shoe.

MINOR T. DE BOLT.
JAMES E. ROBERTSON.